United States Patent [19]
Weiser et al.

[11] Patent Number: 5,982,520
[45] Date of Patent: Nov. 9, 1999

[54] PERSONAL STORAGE DEVICE FOR APPLICATION AND DATA TRANSFER

[75] Inventors: Mark D. Weiser, Palo Alto; Roy Want, Mountain View; Stephanie L. Kozinski, Palo Alto; Hans-Juergen Boehm, San Jose, all of Calif.; Komal S. Sethi, Pelham, N.Y.

[73] Assignee: Xerox Corporation, Stamford, Conn.

[21] Appl. No.: 08/623,436

[22] Filed: Mar. 28, 1996

[51] Int. Cl.⁶ .................................................. H04B 10/00
[52] U.S. Cl. .......................................... 359/172; 359/152
[58] Field of Search .................................... 359/152, 172, 359/145, 142, 143, 159; 340/825.72; 455/514, 515

[56] References Cited

U.S. PATENT DOCUMENTS

| | | | |
|---|---|---|---|
| 4,727,600 | 2/1988 | Avakian | 359/172 |
| 4,856,090 | 8/1989 | Kitani et al. | 359/152 |
| 5,307,297 | 4/1994 | Iguchi et al. | 364/708.1 |
| 5,343,319 | 8/1994 | Moore | 359/152 |
| 5,359,448 | 10/1994 | Laszlo et al. | 359/180 |
| 5,424,859 | 6/1995 | Cleham et al. | 359/172 |
| 5,553,314 | 9/1996 | Grube et al. | 379/63 |

FOREIGN PATENT DOCUMENTS

| 0105540 | 5/1988 | Japan | 359/172 |
|---|---|---|---|

Primary Examiner—Rafael Bacares
Attorney, Agent, or Firm—Robert A. Burtzlaff

[57] ABSTRACT

A personal storage device for receipt, storage, and transfer of digital information to other electronic devices has a pocket sized crush resistant casing with a volume of less than about ten cubic centimeters. A processor is positioned within the casing cavity and attached to the crush resistant casing, while a memory module also positioned within the casing cavity is configured to store received executable applications and data. An infrared transceiver is mounted on the crush resistant casing and in electronic communication with the processor and memory module to provide for receipt and storage of executable applications, and receipt, storage, and transfer of digital information to other electronic devices. The digital information stored by the personal storage device can be intermittently synchronized with other electronic devices.

1 Claim, 5 Drawing Sheets

PERSONAL STORAGE DEVICE FOR APPLICATION AND DATA TRANSFER

FIELD OF THE INVENTION

The present invention relates to a portable electronic device for storage and transfer of digital data. More particularly, the present invention relates to personal storage device capable of receiving executable applications and data through a wireless link.

BACKGROUND AND SUMMARY OF THE INVENTION

Currently available portable computing devices include laptop, notebook, subnotebook, or handheld computers, personal digital assistants, personal organizers, personal communicators (eg. two way pagers) or digitally readable smart cards. These existing portable computing devices can be divided into two classes based on a combination of size, functionality, and processing power. The first class can be considered to be a desktop computer replacement, and is typified by personal digital assistants, personal organizers, subnotebook, notebook, and handheld computers. These are relatively large devices having a processing power and functionality comparable to traditional desktop computers, but sized to permit their ready transport by a user. As would be expected, the small size of a personal digital assistant results in a somewhat reduced functionality as compared to desktop computers, in large part because its size permits only a relatively small display screen and it is unable to support a full sized keyboard. Other limitations in functionality are attendant to the substantial power requirements of the processor, attached harddrive, PCMCIA modem, cursor controllers, and small format keyboard or graphical input device (eg., for pen based personal digital assistants). Trade-offs between available battery power and performance of a personal digital assistant must be made, with its battery lifetime decreasing as communication devices are added, storage capacity increased, memory added, or processing speed enhanced. In practice, users of personal digital assistants or laptop computers have wanted to retain a functionality that approaches a desktop computer, inevitably resulting in a powerful portable computer that is only intermittently available for data transfer or analysis between battery rechargings.

The other class of devices, exemplified by smart cards or two way pagers, is not intended as a desktop computer replacement. Instead, such devices are optimized for transfer of limited amounts of application specific data. For example, a smartcard can be used to enable financial transactions through debit transfers, while a two way pager can be used to receive and send a limited range of preprogrammed responses. As compared to a personal digital assistant, smart cards or pagers can be extremely small, need only limited processing power, and require minimal battery power. Because of its small size, and because the battery lifetime can be measured in months or years, rather than hours, a user is much more likely to habitually carry a powered smart card ready for use than a bulky personal digital assistant that needs constant recharging or battery replacement.

As will be appreciated, the small size and minimal power requirements of smart cards comes at price. Unlike personal digital assistants, smart cards are not generally able to provide a broad range of programmable functions. They are typically limited to a narrow range of specific tasks, such as credit transfers or readout of personal medical data. For example, reprogramming a smart card intended for a limited range of financial transactions to hold and inspect a text file or a spreadsheet is generally not possible.

For transfer of small amounts of data in diverse formats, what is needed is a device having some of the programmable flexibility of a personal digital assistant, with the size and battery power requirements of a pager or smart card. Such a device is much more likely to be carried by a user than a personal digital assistant, and would still provide significantly greater data transfer options than a smart card. Contemplated applications for a device intermediate in functionality and power usage between a smart card and a personal digital assistant include storage of long term data such as name, address, telephone numbers, drivers license number, social security number, medical information, professional qualifications, current employer, personal or corporate web page site identifiers (URL's), e-mail addresses, login information, or even advertising and sales information such as a company product descriptions.

Accordingly, the present invention provides for a class of devices that can be characterized as "personal storage devices". A personal storage device provides a subset of the functionality of full featured personal digital assistant (PDA) or laptop computer, while having a significantly smaller size and electrical power requirements. A personal storage device in accordance with the present invention provides for receipt, storage, and transfer of digital information to other electronic devices, typically through an infrared, optical, or radio link. To ensure long life and durability, the personal storage device has a pocket sized crush resistant casing with a casing cavity therein. A processor, display, and electrically connected memory module are positioned within the casing cavity. The processor is connected to the display and attached to the crush resistant casing, with the memory module being configured to store both received executable applications and data. In preferred embodiments, an infrared transceiver is mounted on the crush resistant casing and in electronic communication with the processor and memory module to provide for receipt and storage of executable applications, and receipt, storage, and transfer of data to other electronic devices.

In another preferred embodiment, the present invention includes a system for receipt, storage, and transfer of personal information in digital format to other electronic devices. This system includes a personal storage device having a pocket sized crush resistant casing with a casing cavity therein, a memory module being positioned within the casing cavity and attached to the crush resistant casing. The memory module is configured to store received executable applications and data. A first infrared transceiver is mounted on the crush resistant casing and maintained in electronic communication with the memory module to provide for receipt and storage of executable applications, and receipt, storage, and transfer of data to other electronic devices. In preferred embodiments, the personal storage device further has a request module for requesting receipt of executable applications or data from a personal computer or other electronic device connected to a second infrared transceiver for transmitting executable applications to the personal storage device in response to the request signal from the request module of the personal storage. Advantageously, this allows for automatic receipt of data, including automatic synchronization with data files maintained on a personal computer.

A personal storage device or system in accordance with the present invention provides a user with the ability to customize or transfer small amounts of data (typically in the range of 128 kilobytes to 1 Megabyte) to many different machines for his or her use, without needing to carry a floppy disk, a personal digital assistant, or a laptop computer. The personal storage device is configured to be small enough to be attached to a keychain or kept unobtrusively in a pocket, or purse. Most importantly, the personal storage device contains a small, modestly powered microprocessor, display, and memory subsystem that can execute communication protocols, accept downloadable applications or data "on the fly" and display, manage, process, transmit, receive, or encrypt data useful to a user.

There are many uses for the personal storage device, transfer of personal and credit information to a merchant utilizing an electronic transaction system. For example, a user of the personal storage device may be required by a merchant to provide many personal details, either verbally, or by filling in a printed form. After receipt of this information, the information must be laboriously typed into the computer, subjecting it to a substantial risk of error through misspellings or mistyping. If a personal storage device were instead employed, the customer would simply point the device at the appropriate computer input device and accurately transfer the required name, address, and credit information with a single button push.

Another contemplated use of a personal storage device is to enhance the ease of use of personal computers or other programmable electronic devices to a user. For example, current personal computer operating systems allow for the possibility of launching a custom set of applications, or providing unique interface features such as predefined icon positions, colors, patterns, and sound alarms. However, if personal computers are heavily customized, they may appear unfamiliar to other users. A personal storage device can eliminate problems associated with shared personal computers having user defined non-standard interfaces by transferring user identification or data that allows for reconfiguration of the originally present personal computer interface.

Yet another feature of a personal storage device in accordance with the present invention is based upon its ability to execute small applications as well as transfer data. The personal storage device can be configured to be location sensitive, with periodic infrared transmissions used to determine the relative or absolute position of other infrared capable electronic devices. A user can then send data to adjacent devices, based on the personal storage devices ability to determine spatial proximity. This function would be particularly advantageous for exchange of information such as "business card" data in a crowded room having many operating personal storage devices. For example, two users attempting to exchange data would merely have to move near each other, direct an infrared output cone toward each other's respective personal storage devices, and depress a button to initiate transfer of information to the adjacent personal storage device.

Additional functions, objects, advantages, and features of the present invention will become apparent from consideration of the following description and drawings of preferred embodiments.

DETAILED DESCRIPTION OF THE INVENTION

Figure 1:
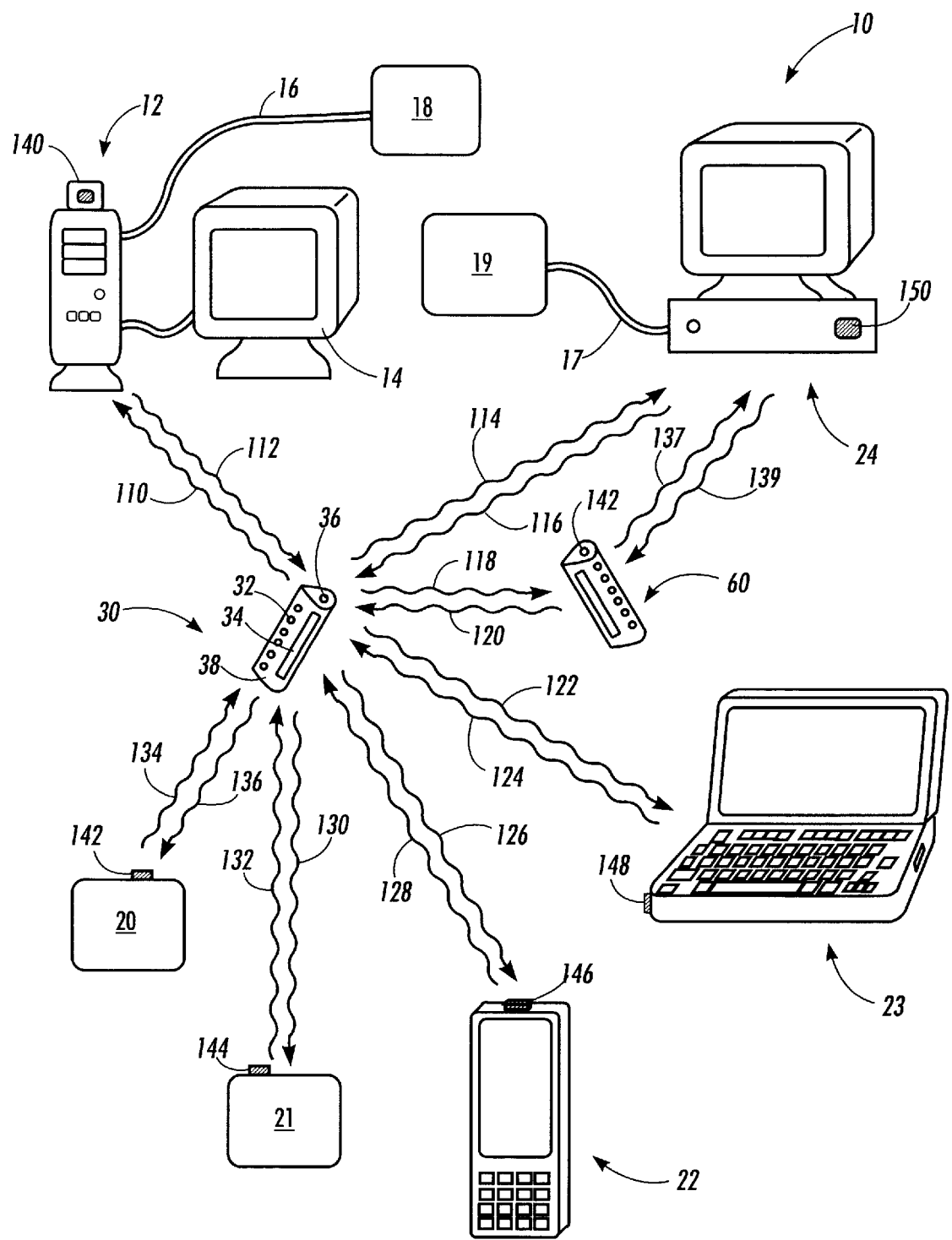
FIG. 1 is a schematic outline of a personal storage device supported by a system for receipt, storage, and transfer of personal information in digital format.

A wireless information transfer system 10 that utilizes a personal storage device 30 for facilitating exchange of executable applications or data between electronic devices is shown in FIG. 1. In the particular embodiment illustrated in FIG. 1, the personal storage device 30 is configured to have a substantially cylindrical shock and crush resistant casing 38 that externally supports an alphanumeric output display 34, several input buttons 32 for user control, and a wireless transceiver 36 for transmission and reception of digital information. The casing 38 is small enough to be easily carried on a keychain, clipped to a user's belt, or dropped in a user's pocket. The casing 38 typically has rectangular dimensions of less than five centimeters square, and less than about 2.5 centimeters thick, or alternatively, a circular diameter less than about five centimeters and a thickness of less than two or three centimeters. Typically, the casing 38 will have a volume between about 10 to about 100 cubic centimeters, and can be constructed from aluminum, stainless steel, or crush resistant/high durability plastics.

As can be seen by inspection of FIG. 1, the personal storage device 30 can be maintained in continuous or intermittent wireless communication with a number of suitably equipped electronic devices, including a personal computer 12 having monitor 14 and transceiver 140, automation control system 20 with transceiver 142, security authorization unit 21 with transceiver 144, personal digital assistant 22 with transceiver 146, notebook computer 23 with transceiver 148, or computer workstation 24 with transceiver 150. The personal computer 12 can be connected by line 16 to a local area network 18, for example, while the computer workstation 24 may be a server connected to a wide area network 19 through line 17. Each of these electronic devices 12, 20, 21, 22, 23, and 24 is able to transfer of information to, and receive of information from, the personal storage device 30. In preferred embodiments wireless communication with the personal storage device 30 utilizes infrared signals adhering to widely utilized IRDA communication standards, although alternative communication standards, or even alternative communication carriers such as radiofrequency, optical, or acoustic can of course be employed.

Figure 2:
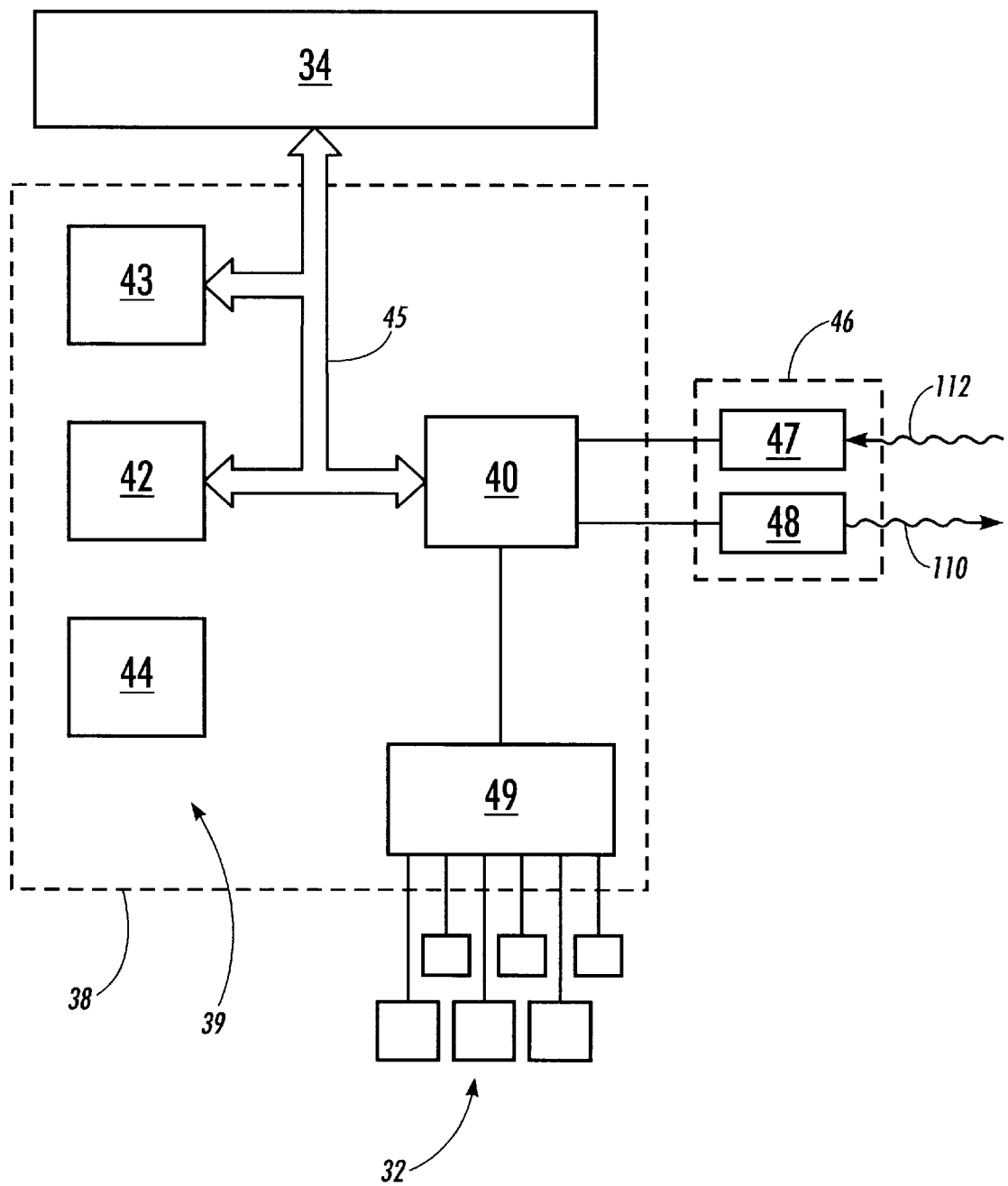
FIG. 2 is an electronic schematic of a personal storage device.

As best seen with reference to the general electronic schematic of FIG. 2, the casing 38 (dotted line) of the personal storage device 30 externally supports a user accessible display 34, input buttons 32, and transceiver 46. The transceiver 46 includes a wireless receiver 47 and a wireless transmitter 48, for respectively receiving wireless transmissions 112 and sending wireless transmissions 110. Internally, the casing cavity 39 of casing 38 holds processor 40, memory 42, a real time clock 43 and input controller 44. In the illustrated embodiment, the display 34, clock 43, memory 42 and processor 40 are connected by a common data bus 45, and all components of personal storage device 30 are powered by a low voltage (typically 3 to 6 volt) power source 44. The power source 44 is typically a commonly available lithium battery, although alkaline batteries, rechargeable nicad batteries, or other types of batteries may be employed. Input from buttons 32 to the processor 40 is mediated through an input controller 40.

In operation, the processor 40 is capable of running small programs or applications stored in memory 42. Processing speed is determined by processor clock rate, and processing may be intermittent to reduce power consumption. Applications running on processor 40 may be able to present data to the user on display 34 (eg., time and date, brief messages, reminders, or acknowledgments), or can be used to send/receive control information from other electronic devices such as illustrated in FIG. 1. For example, the personal storage device 30 may be brought into proximity of a user's personal computer 12. The personal storage device can be programmed to automatically send a request (by way of wireless transmitter 48 and signal 110) to a wireless transceiver connected (typically by a serial port) to personal computer 12. An application(s) running on personal computer 12 interprets the request and automatically sends the appropriate information to the personal storage device, consequently updating the stored appointment or scheduling information in memory 42, and synchronizing data files between the user's personal computer and the personal storage device.

As will be appreciated, similar transfer, synchronization, or updating of information may also occur between the personal storage device 30 and other suitable electronic devices, examples of which are illustrated in FIG. 1. Data can be exchanged via wireless transfer (arrows 126 and 128, mediated by transceiver 146) to the personal digital assistant 22, the notebook computer 23 (arrows 122 and 124, mediated by transceiver 148), or the computer workstation 24 (arrows 114 and 116, mediated by transceiver 150). This information can of course then be transferred to a computer network 18 or 19 as desired. In practice, personal storage device 30 can act as a convenient temporary storage device for digital information that needs to be transferred, for example, from network 18 to network 19. Alternatively, the personal storage device can store a user's authorization information, graphical interface customization information, or other access relevant information capable of simplifying the temporary transfer of a user from personal workstation 12 to workstation 24. This is particularly valuable for organizations having offices or sites not connected in a common wide area network that may still want to provide computer access to temporary visitors.

Another use for the personal storage device 30 involves application specific access or control of electronic devices that are not general purpose computers. For example, the personal storage device 30 can communicate with the automation control system 20 (arrows 134 and 136 to and from transceiver 142) to control, for example, lighting levels, temperature, or other automatable functions. Similarly, the personal storage device can be used in place of electronic locks or numeric keypads that secure facilities by communicating with security authorization unit 21 (transceiver 144, arrows 130 and 132) to allow for automatic unlocking of doors or entranceways.

When applications or devices are in place to permit proximity detection, the functionality of personal storage device 30 can be further extended. For example, if a user is in an environment supporting multiple wireless electronic devices, attempting to exchange information corresponding to that commonly found on business cards may result in repeated attempts to contact multiple wireless devices. This can be avoided if the personal storage device 30 is selected to enter a mode that requires transfer to the nearest wireless device, rather than a specifically named device, or all devices in a room. In practice, exchange of electronic "business cards" with another user of a personal storage device (personal storage device 60, with transceiver 149, and wireless communication indicated by arrows 118 and 120) would only require that the exchanging users' move adjacent to each other, and trigger a button specified by an executable application running of the personal storage device. The personal storage device 30 can determine the spatial locations of eligible wireless electronic devices, and send the required data to the nearest wireless electronic device, in this case the personal storage device 60. The respective users of personal storage device 30 and personal storage device 60 can later transfer the information into an address and contact database running on their respective desktop personal computer 12 and workstation 24. Advantageously, the use of wireless digital transfer in accordance with the present invention reduces the chance of error inherent in any transcription of paper based business card information to digital format.

Figure 3:
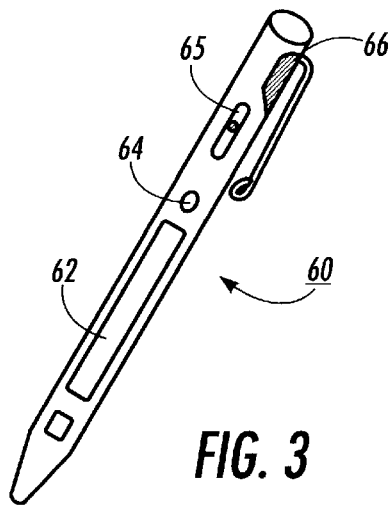
FIGS. 3, 4, and 5 illustrate alternative crush resistant casing forms, with various display and input devices respectively shown.
Figure 4:
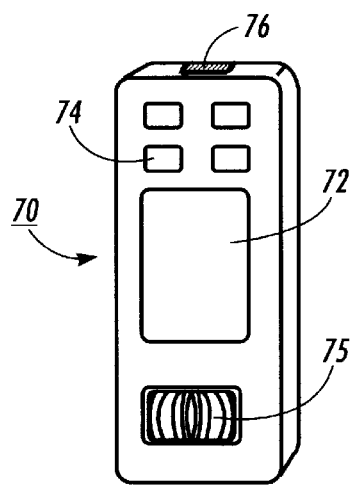
Figure 5:
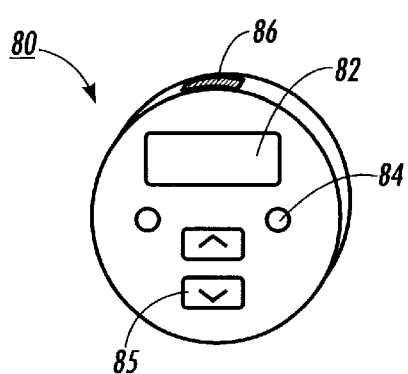

As will be appreciated, the exact form, user interface, and contents of a personal storage device in accordance with the present invention can be widely varied to suit the needs of a user. For example, FIG. 3 illustrates a roughly pen shaped personal storage device 70 optimized for clipping to a shirt pocket. Two buttons 64 and a slide 65 provide user input, with an infrared transceiver 66 being used for wireless communication, and display 62 used for showing brief messages or confirmations. Alternatively, a somewhat larger form factor rectangular personal storage device 70 more suitable for clipping to a user's belt is illustrated in FIG. 4. Device 70 is controlled with buttons 74 and a thumbwheel 75, with a much larger (as compared to device 60) display 72 being available to display information received through transceiver 76. Yet another form for a personal storage device 80, that of a circular disk, is illustrated in FIG. 5. Again, this device supports a transceiver 86 and buttons 84, with marked arrow buttons 85 being used for scrolling through lists on display 82. As will be appreciated by consideration of the foregoing embodiments, a wide variety of embodiments, including embodiments having non-utilitarian or decorative aspects, can present a suitable physical form for supporting functionality of a personal storage device.

Figure 6:
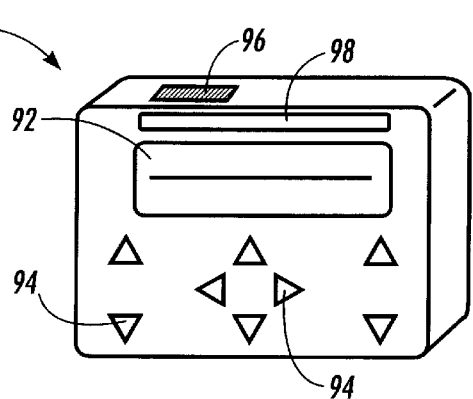
FIG. 6 illustrates a presently preferred form for a personal storage device, having a plurality of buttons and thumbwheel functioning as a physical user interface, and an alphanumeric display for output.

A presently preferred personal storage device 90 is illustrated in FIG. 6. This illustrated embodiment is a rectangular solid, having dimensions of about 4 centimeters wide, 2.5 centimeters long, and about 1 centimeter thick, giving a volume of about 10 cubic centimeters. This size is much smaller than typical personal digital assistant, which typically have a volume greatly in excess of 100 cubic centimeters, and dimensions much greater than the "key chain" or pocket sized form of the present device. Personal storage device 90 supports a two line alphanumeric display 92. Commonly available inexpensive displays permit presentation of sixteen alphanumeric characters on each line, but more expensive displays having twenty or more alphanumeric characters can of course be used if needed. Buttons 94 can be used for initiation and control of tasks such as menu selection, program execution, data transmission, or list scrolling. In addition, it is possible to provide analog input devices such as a touch sensitive strip 98 to provide a user with additional control options.

Figure 7:
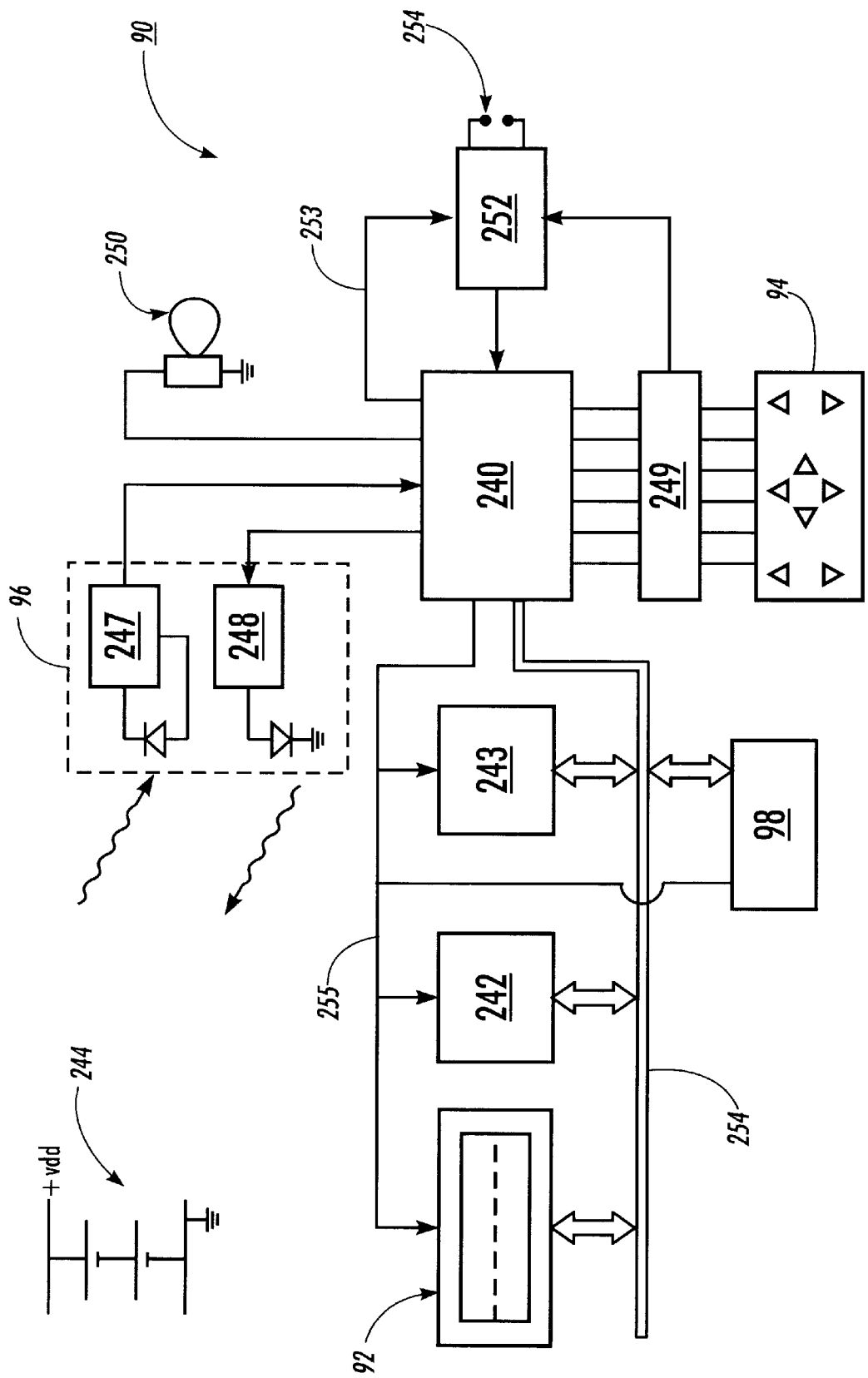
FIG. 7 is a detailed electronic schematic of the personal storage device illustrated in FIG. 6.

An electronic schematic of the personal storage device 90 is illustrated in FIG. 7. In preferred embodiments, most elements are mounted on a circuit board that is later positioned in a protected position within the crush resistant casing, with user interface elements such as a display screen 92 and buttons 94 projecting from the casing cavity to permit user access. In one preferred embodiment, the processor 240 consists of a low power microcontroller, such as the 8051 type microcontroller, the memory 242 is a low power CMOS RAM having 128 KB of storage, and the clock 243 is a standard clock such as the PCF8593 by Philips. A 32 character display 92 having two rows of characters 16 characters in length is also provided, with the display 92, memory 242, and clock 243 controlled by processor 240 through a control bus 255. Addresses and data are passed along a data bus 245. Wireless transmission and reception of data and executable applications is provided by infrared transceiver 96, which includes transmitting LED and connected infrared transmitter driver 248, and a receiving LED and infrared receiver amplifier 247 connected to processor 240. Auditory signaling is also enabled by provision of a piezoelectric speaker 250 connected to processor 240. This can be used to provide tones that signal certain states of the device 90 to the user or with suitable Pulse Position Modulation (PPM) can generate telephone quality DTMF tones for the purpose of dialing numbers contained in stored data. Higher quality DTMF tones can be produced by a standard part (PCD3312) connected to the control bus and drive the piezoelectric speaker 250 directly.

A reset control module 252 is connected to the processor. When the processor 240 enables the reset control module 252, any switch press signal received from switch interface 249 resets the state of the processor 240. Reset can also occur by manual activation of a reset switch 254. User control of the personal storage device occurs primarily through operation of switches 94, which are connected to the switch interface 249. Additional user control can be provided by a touch sensitive strip, thumbwheel, or other device connected to a analog to digital converter 98 (which may be, for example, a PCF8591 converter by Philips). Power to the foregoing electronic elements is provided by batteries 244, typically consisting of a pair of 3 volt lithium cells, or alternatively, by a single 3 volt lithium cell and an attached 3 volt to 5 volt converter.

Operation of the foregoing embodiment of a personal storage device 90 is illustrated with reference to FIG. 7. The 8051 microcontroller has a built-in power-down mode of operation utilized by the device 90. When the device 90 is not in use receiving information, processing data, or transmitting information, it is maintained in a power-down mode to conserve the limited available power supply. To bring the device 90 out of this power down mode, reset control module 252 must be triggered. The switch interface 249 is designed to detect any switch press and initiate a reset to the processor 240, at which point it will execute code that disables further reset signals from the switch interface module 249 by asserting the reset inhibit control signal 253. Once in the powered up state, all the processor peripherals (eg. display 92, transceiver 96) are powered-up, and a timer is started. If there is no communication, or switch activity, for a set period of time (currently about 45 seconds) the processor 240 will disable the reset inhibit control signal 253, turn off all the processor peripherals, and enter the power-down mode by setting a bit in the processor's 240 PCON register. In addition to this switch based reset procedure, the processor 240 can also receive a reset signal as the result of applying power (for example, by changing the batteries) or pressing a manual reset button accessible in emergencies through a small hole in the case of device 90.

Figure 8:
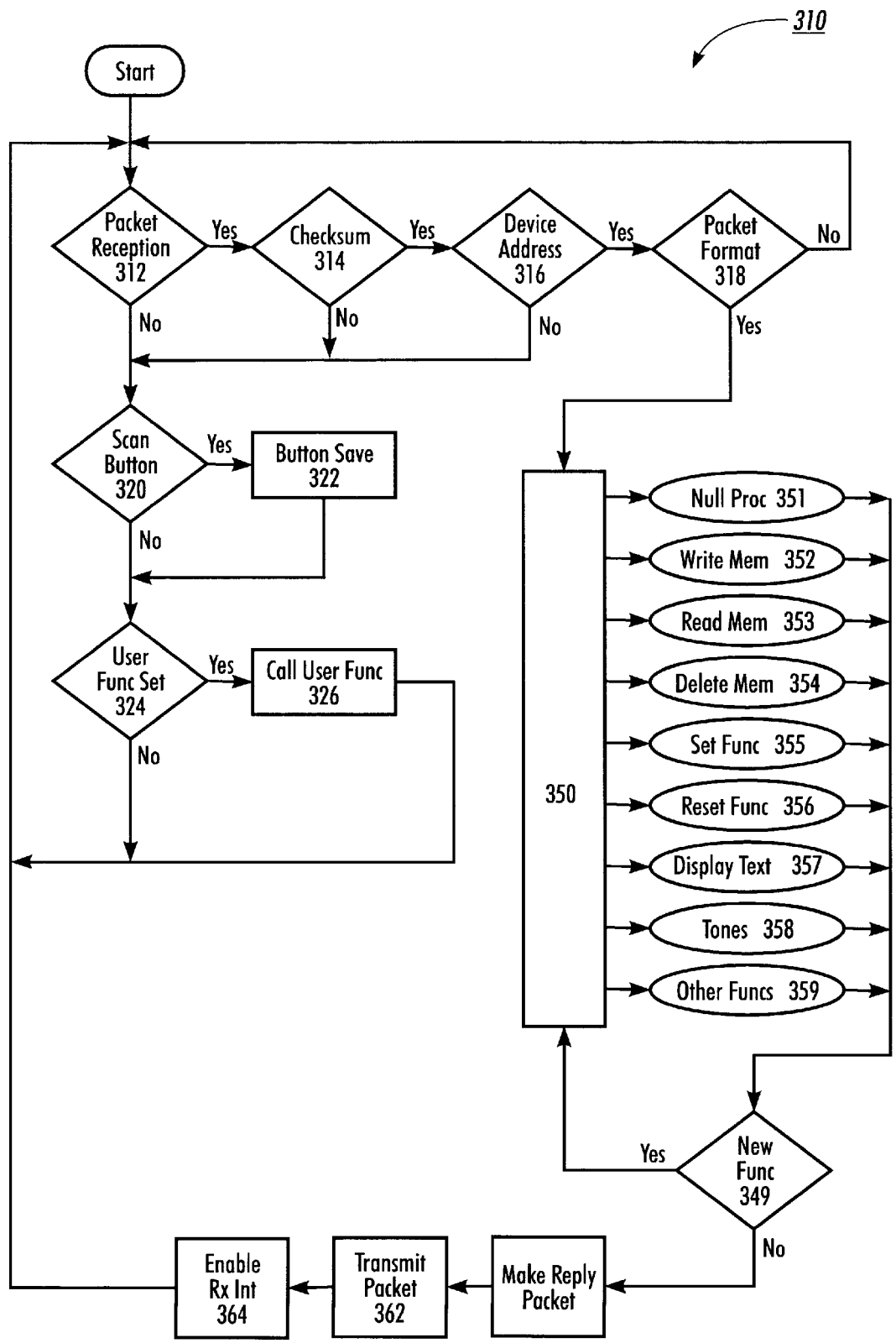
FIG. 8 is a detailed flow chart illustrating control logic for the personal storage device illustrated in FIGS. 6 and 7.

After the power-up activity the device 90 enters a main polling loop 310 as illustrated in FIG. 8. This main polling loop waits for switch presses, or the reception of a packet of data through the LED and infrared (IR) receiver amplifier 247 of infrared transceiver 96 in FIG. 7. Alternatively, the main polling loop 310 can respond to a registered user defined procedure. Received IR packets are processed through the interrupt routine of processor 240 of FIG. 7. The LED and IR receiver amplifier 247 convert pulses of IR light into corresponding electrical pulses that are fed into an interrupt pin of the processor. The format of these pulses conforms to the physical and link layer formats (IrLAP) described in the industry standard Infrared Data Association IrDA specification, version 1.0, the disclosure of which is herein specifically incorporated by reference. As the bits are received the interrupt procedure is called for each one, resulting in the assemblage of received bits into bytes, and bytes into a packet, whereupon the main loop 310 of FIG. 8 is notified.

As seen in FIG. 8, after packet reception 312 the packet is examined for a valid IrLAP packet format, including a checksum 314 to establish data integrity, evaluation of device address 316, and check of packet format 318. If any of these tests fail and a valid packet was not received, the buttons on the device 90 are scanned for button presses (scan button 320). If a button was pressed, the last button state is saved (button save 322). This button state can be passed on to determine if a user definable function was being invoked (user func set 324 and call user func 326), whereupon the device 90 returns to start to wait for additional reception of packets.

In the alternative, if a valid packet was received that passes tests 312, 314, 316, 318*f*, the payload of the valid IrLAP packet is passed to a decode procedure 350 that decodes its contents and determines the nature of the request it represents. Then, a single procedure out of a number of possible procedures is called to modify state of the device 90 (except of course for a null procedure call 351). For instance, the called procedure may cause the device 90 to have its memory written (write mem 352), memory read (read mem 353), or memory deleted (delete mem 354). Alternatively, the called procedure may establish or reset the definition of a user-defined-function (respectively set func 355 and reset func 356), write text to the display (display text 357), or generate a sequence of tones from the piezo-speaker( tones 358). Other user defined procedure function calls may also be utilized if necessary or desired (Other funcs 351), and additional functions can be added to extend the functionality of decode proc 350 by use of a call to new func 349.

After executing the function, the packet is examined for other procedure calls and each procedure call is executed in turn until a packet termination symbol is found. At this time a reply packet is assembled (make reply packet 360). The reply packet contains the results of executing the received packet (in many cases this may just be an acknowledgment of success). The reply packet is then serially transmitted (transmit packet 362 and enable Rx Int 364 of FIG. 8)out of the LED and IR transmitter amplifier 248 of IR transceiver 96 (of FIG. 7) in accordance with formats defined by the IrDA specification previously discussed and incorporated by reference.

In a most preferred embodiment suitable for intermittent communication often encountered when using devices according the present invention, an "RPC" type interface can be layered atop the IrLAP defined subset of the link layer protocol. RPC type packets incorporate a sequence number that ensures idempotent operation. This allows the client of the RPC, such as another personal storage device or a personal computer, to retry the requests, after a suitable time-out, without being subject to errant behavior that might otherwise result from receiving the same request twice.

In a typical operating session, after receiving a number of RPC type packets, the device 90 might contain new executable code and data that is loaded into its memory. A "call user function 326" request such as previously discussed will establish one of these pieces of code in such a way that it is called from the processor main-loop. The device 90 can now execute this newly loaded code, which may include features such as sending IR packets to some other device in response to pressing the switches. A typical use of this ability to download data and executable applications on demand is an electronic diary. For example, new data can be downloaded into the electronic diary or the data management executable of the electronic diary can itself be changed. This would greatly increase the flexibility of data presentation. Of course, any of the other functions previously discussed in the present specification or apparent to those skilled in the art can also be subject to "on demand" data or executable application updates. The loading protocol can also be used to add new functions to the decode table 350, thus allowing new RPC functionality across the infrared link.

As those skilled in the art will appreciate, other various modifications, extensions, and changes to the foregoing disclosed embodiments of the present invention are contemplated to be within the scope and spirit of the invention as defined in the following claims.

The claimed invention is:

1. A system for receipt, storage, and transfer of personal information in digital format to other electronic devices, the system comprising a personal storage device having a pocket sized crush resistant casing with a casing cavity therein, a memory module being positioned within the casing cavity and attached to the crush resistant casing, the memory module being configured to store received executable applications and data, and a first infrared transceiver mounted on the crush resistant casing and in electronic communication with the memory module to provide for receipt and storage of executable applications, and receipt, storage, and transfer of data to other electronic devices, the personal storage device having a plurality of buttons and at least one of a thumbwheel and a touch sensitive control strip connected to the processor for user input control, with the personal storage device further having a reguest module for reguesting receipt of executable applications, the request module being connected to the first infrared transceiver to permit transmission of a request signal, and an electronic device having a second infrared transceiver for transmitting executable applications to the personal storage device in response to the request signal from the reguest module of the personal storage device.

\* \* \* \* \*